US012458904B2

(12) United States Patent
Chubukov et al.

(10) Patent No.: US 12,458,904 B2
(45) Date of Patent: Nov. 4, 2025

(54) METHOD AND APPARATUS TO CONDENSE MAGNESIUM VAPOR USING A FLUID-COOLED HEAT EXCHANGER

(71) Applicant: BIG BLUE TECHNOLOGIES LLC, Westminster, CO (US)

(72) Inventors: Boris Chubukov, Boulder, CO (US); Aaron Palumbo, Denver, CO (US); Jeremiah Jeffries, Boulder, CO (US)

(73) Assignee: Big Blue Technologies Inc., Cheyenne, WY (US)

( * ) Notice: Subject to any disclaimer, the term of this patent is extended or adjusted under 35 U.S.C. 154(b) by 550 days.

(21) Appl. No.: 17/759,086

(22) PCT Filed: Nov. 20, 2020

(86) PCT No.: PCT/US2020/061617
§ 371 (c)(1),
(2) Date: Jul. 19, 2022

(87) PCT Pub. No.: WO2021/150302
PCT Pub. Date: Jul. 29, 2021

(65) Prior Publication Data
US 2023/0041658 A1 Feb. 9, 2023

Related U.S. Application Data

(60) Provisional application No. 62/963,533, filed on Jan. 20, 2020.

(51) Int. Cl.
*B01D 5/00* (2006.01)
*C22B 5/16* (2006.01)
(Continued)

(52) U.S. Cl.
CPC ......... *B01D 5/0012* (2013.01); *B01D 5/0015* (2013.01); *B01D 5/0045* (2013.01);
(Continued)

(58) Field of Classification Search
CPC .. B01D 5/0012; B01D 5/0015; B01D 5/0045; B01D 7/02; C22B 5/16; C22B 9/02;
(Continued)

(56) References Cited

U.S. PATENT DOCUMENTS 2,025,740 A * 12/1935 Hansgirg ................ C22B 26/22
252/181.7
2,238,907 A 4/1941 Mcconica et al.
(Continued)

FOREIGN PATENT DOCUMENTS

CN 101956083 B 11/2011
CN 104674016 A 6/2015
(Continued)

OTHER PUBLICATIONS

Australian Patent Office International Search Report completed Feb. 22, 2021 for application PCT/US2020/061617.
(Continued)

*Primary Examiner* — Ricardo D Morales
(74) *Attorney, Agent, or Firm* — HOLZER PATEL DRENNAN

(57) ABSTRACT

A system and method that uses a high-temperature condenser to collect magnesium produced by thermal reduction, electrolysis, or distillation. The condenser is a common heat exchanger design (shell/tube, plate/plate, etc.) and uses a heat transfer fluid to cool and condense magnesium gas, e.g., to 200-900° C. under vacuum or pressure conditions. Solid or liquid magnesium is collected in the condenser along with any by-products or impurities at a purity greater than 35 wt-% Mg. Magnesium is subsequently liberated from the condenser by raising the temperature of the system, lowering the pressure, or both, to induce a phase change in the metal, such as melting or distillation, for further purification to, e.g., >90 wt-% Mg.

15 Claims, 2 Drawing Sheets

(51) Int. Cl.
*C22B 9/02* (2006.01)
*C22B 26/22* (2006.01)
*F28D 5/00* (2006.01)
*F28D 21/00* (2006.01)

(52) U.S. Cl.
CPC .............. *C22B 5/16* (2013.01); *C22B 9/02* (2013.01); *C22B 26/22* (2013.01); *F28D 5/00* (2013.01); *F28D 2021/0022* (2013.01); *F28D 2021/0063* (2013.01)

(58) Field of Classification Search
CPC ... C22B 26/22; C22B 9/04; F28D 5/00; F28D 2021/0022; F28D 2021/0063; F28D 7/16; F28D 2021/0061; Y02P 10/20
See application file for complete search history.

(56) References Cited

U.S. PATENT DOCUMENTS

| | | | |
|---|---|---|---|
| 2,257,910 | A | 10/1941 | Kirk |
| 2,381,403 | A | 8/1945 | Chisholm |
| 2,381,405 | A | 8/1945 | Griswold |
| 2,430,389 | A | 11/1947 | Frederick |
| 2,514,275 | A * | 7/1950 | Allen ................ C22B 26/22 266/152 |
| 2,971,833 | A | 2/1961 | Jean et al. |
| 5,258,055 | A | 11/1993 | Pargeter et al. |
| 5,358,548 | A | 10/1994 | Player et al. |
| 7,641,711 | B2 | 1/2010 | Schoukens et al. |

FOREIGN PATENT DOCUMENTS

| | | | |
|---|---|---|---|
| EP | 0075836 | A2 | 4/1983 |
| KR | 20110076565 | A * | 10/2012 |
| KR | 101235716 | B1 | 2/2013 |
| KR | 101315352 | B1 | 10/2013 |
| KR | 101353454 | B1 | 1/2014 |
| KR | 101364483 | B1 | 2/2014 |
| WO | 2015031682 | A1 | 3/2015 |

OTHER PUBLICATIONS

Chubukov, Boris A., et al., "Pressure dependent kinetics of magnesium oxide carbothermal reduction", Thermochimica Acta, 2016, 23-32.
Hansgirg, F.J., "The Iron Age", 1943.
Prentice, L.H., et al., "Carbothermal production of magnesium: Csiro's Magsonic Process", Magnesium Technology, 2012.
Winand, R., et al., "Production of magnesium by vacuum carbothermic reduction of calcined dolomite", Institution of Mining and Metallurgy, 1990, C105-C112.
Yang, Cheng-Bo, et al., "Analysis of the behavior of magnesium and CO vapor in the carbothermic reduction of magnesia in a vacuum", Journal of Magnesium and Alloys, 2014, 50-58.

* cited by examiner

METHOD AND APPARATUS TO CONDENSE MAGNESIUM VAPOR USING A FLUID-COOLED HEAT EXCHANGER

CROSS REFERENCE TO RELATED APPLICATIONS

This application claims the benefit of U.S. Provisional Application No. 62/963,533, filed Jan. 20, 2020, the contents of which are hereby incorporated herein by reference for all purposes to the extent such contents do not conflict with the present disclosure.

STATEMENT REGARDING FEDERALLY SPONSORED RESEARCH OR DEVELOPMENT

This invention was made with government support under grant number 1738536 awarded by the National Science Foundation. The United States government has certain rights in the invention.

FIELD OF INVENTION

The present disclosure generally relates to the condensation, separation, and recovery of metals. More particularly, the disclosure relates to the capture of product from thermal reduction, electrolysis and distillation of magnesium compounds.

BACKGROUND

Magnesium (Mg) metal can be produced from ores by electrolysis or thermal reduction. Electrolysis reduces magnesium ions dissolved in a suitable electrolyte to magnesium metal using electrical current. Thermal reduction requires a second material to act as a reducing agent to reduce a magnesium-containing compound, such as magnesium oxide. Magnesium oxide or other magnesium-containing compounds can be derived from a variety of ores (e.g., magnesite, brucite, dolomite, olivine), salt brines, or other magnesium-rich materials. At the temperature required for thermal reduction, magnesium metal is produced as a gas. This gas must be subsequently condensed in order to collect the Mg metal product.

In thermal reduction methods, reducing agents such as FeSi, $CaC_2$, Al, and other metals and carbides produce a relatively clean condensed Mg product because mostly Mg is volatilized in the reduction process. Carbon as a reducing agent produces an impure Mg condensate as the by-product CO inhibits the condensation of $Mg_{(g)}$ and oxidizes some or all the Mg product during condensation. The resulting condensate is often a pyrophoric mixture of Mg/MgO/C and other impurities.

Many previous efforts at magnesium metal production by carbothermal reduction have used solids (e.g., U.S. Pat. Nos. 2,238,907A, 2,430,389A, 5,358,548A, 2,257,910A), liquids (U.S. Pat. Nos. 2,381,403A, 2,381,405A, EP0075836A2, U.S. Pat. No. 5,258,055A), or gases (e.g., Hansgirg, "*The Iron Age*", 1943) as a condensation medium. Even though some of these methods demonstrated decent yields of magnesium metal (~70% molar yield), the collection of this impure and often pyrophoric Mg product and the separation of Mg from the condensation medium and/or the reversion product (C and MgO) have proven to be the most difficult process steps.

Commercial plants have used carbothermal reduction and subsequent quenching of the produced $Mg_{(g)}$ and CO with a large quantity of reducing gas ($CH_4$ and/or $H_2$) (see, Hansgirg 1943). The ~70% molar yield from the reduction produced a ~50% Mg metal powder by weight. Attempts to melt this powder into a pure Mg melt proved difficult and dangerous. Instead, the Mg contained in the powder was distilled to produce a pure crown. This crown could be easily melted into ingot, but the impure powder produced from the quench condensation could not be distilled directly as the reversion product would be entrained in the $Mg_{(g)}$ flow, disrupting crown formation. To prevent the entrainment of the reversion product, the powder was either tableted or processed in an oil. For tableting, the dry powder was conveyed under a protective atmosphere to a rotary tablet press, and for oil processing, the powder was drenched in oil and pumped into the distillation retorts. The oil method was considered safer, but the oil had to first be pyrolyzed before the magnesium could be distilled, adding to the operating costs. Neither method proved to be commercially viable.

Winand et al., in "*Production of magnesium by vacuum carbothermic reduction of calcined dolomite*", Institution of Mining and Metallurgy, 1990, C105-C112, (1990) demonstrated that vacuum conditions produced a powder with higher magnesium content using oil-cooled spinning belts and pins as the condenser. Even with the higher Mg concentration in the condensate, the separation of Mg from the reversion product and the transport of the powder product proved too difficult and dangerous.

More recently, several studies have demonstrated that a relatively pure (>90% molar yield) Mg powder can be produced without a condensation medium by cooling the Mg and CO products through a wall (see, Yang et al., "*Analysis of the behavior of magnesium and CO vapor in the carbothermic reduction of magnesia in a vacuum*", Journal of Magnesium and Alloys. pp. 50-58 (2014); Chubukov et al., "*Pressure dependent kinetics of magnesium oxide carbothermal reduction*", Thermochimica Acta, pp. 23-32, (2016)) or by passing the gas mixture through a converging diverging nozzle (see, Prentice et al. 2012).

Despite the further improvement in Mg condensate quality, material handling and purification (separation) have proven too difficult for a process to be commercialized.

SUMMARY OF THE DISCLOSURE

This disclosure is directed to a system and a method for collecting magnesium (Mg) from a gaseous stream that includes magnesium vapor and optionally non-condensable carbon monoxide or other gases. This gas can be produced from a thermal reduction furnace, a high-temperature electrolytic cell, a distillation furnace, or any other reactor liberating magnesium in a gaseous state from ore or crude metal.

The system includes a heat exchanger (condenser) of common design (e.g., shell/tube, plate/plate, and variations thereof) with a high surface area available for heat transfer. The heat exchanger is operated in the range of 200-900° C. or 200-650° C. to promote liquid condensation and/or solid deposition of magnesium (or other metal) from the gaseous feed stream inside the heat exchanger. The system, and specifically the process gas side of the condenser, can operate at subatmospheric pressures to reduce furnace load. Any suitable heat transfer fluid can be used in the heat-exchanger, and that fluid is not in direct communication with the magnesium-rich stream. The two streams exchange heat but do not mix. Suitable heat transfer fluids include but are not limited to molten metals (e.g., lead, tin, bismuth, etc.), molten salts (e.g., nitrates, chlorides, fluorides, etc.), oils, high-pressure steam/water, and/or air. The heat exchanger configuration and its operational parameters described herein impede the oxidation of magnesium and the production of entrained powders.

Magnesium deposits or condensate and any reversion by-product or impurities accumulate on the walls of the heat exchanger. The magnesium is subsequently liberated from the condenser by raising the temperature of the system, lowering the pressure, or both to induce a phase change in the metal. Solid and/or liquid magnesium deposits/condensate can be melted and/or distilled from the initial condensate. If melted, the liquid magnesium can flow into another chamber for further processing. If distilled the gaseous magnesium can flow into another chamber for subsequent condensation and/or deposition. In this manner, magnesium metal can be separated from by-products and impurities during processing to recover metal at >90 wt-% Mg.

A cyclic batch process is possible by using multiple condensers to achieve continuous production. This method can be used for recovering magnesium metal produced by carbothermic reduction as there is an efficient separation of metal and reversion by-product.

In one particular implementation, this disclosure provides a method for condensing magnesium (Mg) from a gaseous stream of magnesium and carbon monoxide produced by carbothermal reduction. The method includes feeding a magnesium-containing gaseous stream at a temperature of at least 650° C. into a heat exchanger, cooling the magnesium-containing gaseous stream with a heat transfer fluid at a temperature of 200-900° C. or 200-650° C. in the heat exchanger to obtain magnesium metal on the walls of the heat exchanger, the product being at least 35 wt-% Mg metal. The magnesium metal can be distilled from the crude product by raising the temperature of the system to above 650° C. at a pressure below 400 Pa, with the resulting gaseous magnesium stream being condensed and/or deposited at a higher purity (e.g., >99 wt-% Mg).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
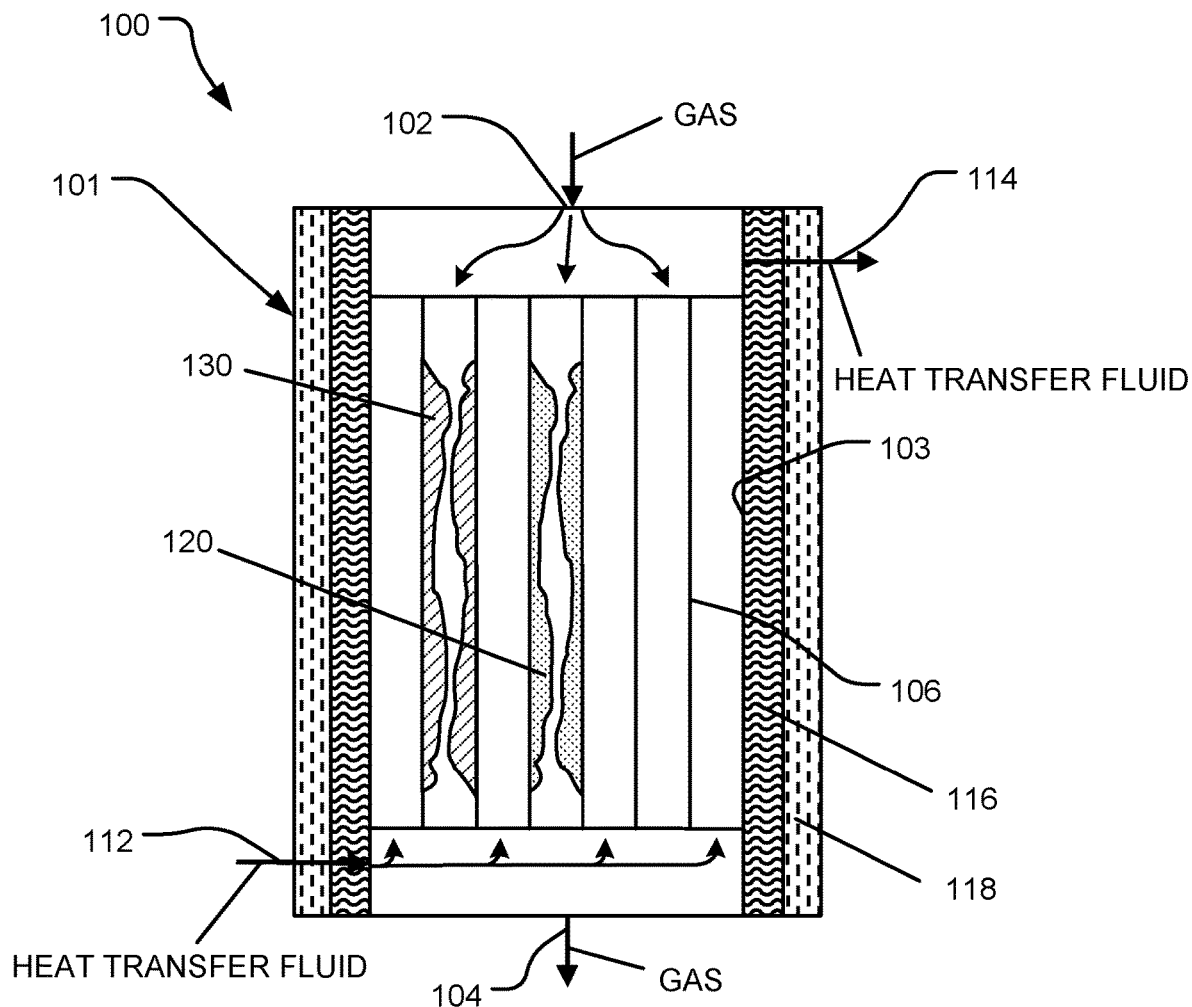
FIG. 1 is a schematic side view of a condenser.

As indicated above, this disclosure is directed to a system and method for condensing and/or depositing, as a liquid and/or a solid, magnesium (Mg) metal from a gaseous feed stream. The system and method use a condenser that has an inlet for receiving a magnesium-containing gas mixture stream at a temperature above 650° C., a heat exchange region downstream of the inlet, and an outlet for removing any non-condensable gaseous stream from the heat exchange region. The condenser also has an inlet and an outlet for a heat transfer fluid (e.g., a cooling fluid) into and out from the heat exchange region that does not directly contact the gaseous stream. The product condensed or deposited on the walls of the heat exchanger is at least 35 wt-% Mg, in some implementations at least 50 wt-% Mg.

The magnesium-containing vapor or gaseous stream can be produced by any method, including carbothermal reduction (CTR) by heating any suitable carbon/ore mixture to initiate the carbothermal reduction. The resulting gaseous product stream, composed of $Mg_{(g)}$ and CO and other minor impurities, flows from the CTR furnace into the condensation vessel or condenser described herein. The gaseous stream can also be produced by metallothermic processes which produces a cleaner magnesium product directly from the ore (including from magnesium oxide rich ores), as little to no carbon monoxide is co-produced. Certain furnaces have further improved condensate quality by controlling slag composition to minimize SiO volatilization. Similarly, the resulting gaseous product stream, composed of cleaner $Mg_{(g)}$ and few impurities, flows from the furnace into the condensation vessel or condenser described herein. The magnesium-containing gaseous stream can alternately be produced by distillation of crude magnesium metal, or high temperature electrolysis.

The condensation vessel or condenser is of a common design heat exchanger (e.g., shell/tube, plate/plate, and variations thereof) with a relatively high solid surface area available for heat transfer. The heat exchanger can have fins, baffles, or any other physical features to facilitate heat exchange between the heat transfer fluid side and the gas side. The heat exchanger operates in the range of 200-900° C., in some implementations in the range of 200-650° C.; for example, a temperature range of 700-750° C. results in liquid magnesium condensation, whereas a temperature range of 400-600° C. promotes heterogeneous Mg crystal deposition on the walls of the heat exchanger. The process may operate at any pressure, but preferably at subatmospheric pressures to reduce the furnace load. Fast heat transfer rates and tight temperature control in the condenser impede the production of entrained powders as the product sticks to the heat exchanger walls and mitigate reversion of the metal product, e.g., to MgO, by avoiding the formation of high surface area Mg.

Any suitable heat transfer fluid can be used in the heat exchanger, e.g., molten metals (e.g., lead, tin, bismuth, etc.), molten salts (e.g., nitrates, chlorides, fluorides, etc.), oils, high-pressure steam/water, and/or air, to cool the gaseous magnesium. The Mg will condense and/or deposit from the gaseous stream at any temperature below the boiling point of Mg at the operating pressure. However, continued condensation/deposition or condensation/deposition at too low of a temperature (e.g., less than 200° C.) results in undesired higher reversion and fine powder production.

The resulting material is a non-pyrophoric (but still flammable) and relatively pure (≥35 wt-% Mg, in some implementations≥50 wt-% Mg) magnesium product, typically with a particle size>100 µm if a solid, although smaller particles may be obtained. Mg can be separated and purified from this product by raising the temperature of the system and/or lowering the pressure to induce a phase change in the metal. Liquified Mg can flow from the heat exchanger walls and be collected for subsequent Mg processing. Gasified Mg can flow into a secondary condenser to be collected as a liquid or solid product. This in situ method of collection and separation can produce a pure magnesium metal (e.g., >99 wt-% Mg)

The heat exchanger temperature can be increased by using a higher temperature heat transfer fluid (now a heating fluid), electric and/or gas heating the outside and/or inside of the heat exchanger, a combination thereof, or any other means.

The pressure of the heat exchanger can be reduced by using a vacuum pump, jet ejector, or any other method. If the product is melted (by heating above the melting temperature), the liquid Mg can flow into any suitable collection vessel, and if distilled (by heating above the boiling or vaporization temperature) the Mg can be condensed or deposited into any suitable condenser without fear of substantial reversion. The resulting product is pure, at least 90 wt % Mg, in other implementations at least 95 wt-% Mg, and yet in other implementations at least 99 wt-% Mg.

The gaseous stream flow from the furnace, before the separation step is initiated, can be paused or terminated to inhibit and preferably prevent any further oxidation. This may be done by plugging the condenser inlet, bypassing the condenser to another condenser, turning off furnace power, or any other method.

The heat exchanger is constructed of any suitable alloy as long as it can withstand the (high) temperature cycling and corrosive nature of both the gaseous feed and heat-transfer fluid for extended periods. Although stainless steel alloys such as 304 and 316 provide good corrosion and temperature resistance to many high temperature fluids, they have known corrosion issues with magnesium metal. The heat exchanger could thus be constructed of steel, ferritic stainless steels, other stainless steels, Inconel clad steel, graphite, non-oxide ceramics, or any other suitable material. A liner can be included on one or both sides of the heat exchanger, i.e., the heat transfer fluid side or the magnesium side. Suitable liners for the magnesium side include mild-steel and graphite.

The condenser can be chemically or physically cleaned between batches or as needed to maintain a clean condensation surface. Physical cleaning could be done using brushes, scrapers, nozzles, or any other suitable method. Chemical cleaning could be done by adding another fluid to help gasify deposits. For carbon deposits, this could be done by flowing $O_2$ into the condenser.

This batch process can be cycled with multiple condensers such that a continuous process is achieved.

In the following description, reference is made to the accompanying drawing that forms a part hereof and in which is shown by way of illustration at least one specific implementation. The following description provides additional specific implementations. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples, including the figures, provided below. In some instances, a reference numeral may have an associated sub-label consisting of a lower-case letter to denote one of multiple similar components. When reference is made to a reference numeral without specification of a sub-label, the reference is intended to refer to all such multiple similar components.

FIG. 1 illustrates an example of an apparatus 100 commonly known as a condenser but can also be called a heat exchanger. Throughout the discussion herein, the apparatus 100 will be referred to as a condenser 100, although it is to be understood that those skilled in the art may know it by other terminology. The particular condenser 100 of FIG. 1 has an internal heat exchanger having a shell and tube configuration although in alternate implementations it could be a, e.g., plate/plate condenser, or have another design having multiple surfaces (walls) for heat exchange. The condenser 100 is used for the condensation of magnesium metal from a gaseous stream.

The condenser 100 has a housing 101 with a gaseous stream inlet 102 at the top or upper end of the housing 101 and a gaseous stream outlet 104 at the bottom or lower end of the housing 101. Within the housing 101 is a heat exchange chamber 103. A gaseous stream having gaseous magnesium therein, e.g., resulting from any smelting operation, flows into the chamber 103 from the inlet 102 via a plenum that distributes the gaseous stream throughout the chamber 103.

As with a typical shell and tube configuration, the chamber 103 has a plurality of tubes 106 distributed throughout the chamber 103, in this example, in a generally vertical orientation. From the inlet 102, the gaseous stream flows to and through the tubes 106 to the outlet 104. In other implementations, the tubes may be arranged in a horizontal or other orientation.

The housing 101 also has a second inlet 112 and a second outlet 114, the inlet 112 at the bottom or lower end of the housing 101 and the outlet 114 at the top or upper end of the housing 101. A heat transfer fluid or media flows from the inlet 112 through the shell-side of the chamber 103 (i.e., not through the tubes 106) around the tubes 106 to the outlet 114. In this example, the heat transfer fluid flows countercurrently to the gaseous stream; in other implementations, other flow patterns may be used, such as concurrently or parallel flow.

The heat transfer fluid controls the temperature within the chamber 103 and of the inputted gas as it flows through the tubes 106 to the outlet 104. To condense or deposit the magnesium in the tubes 106, the heat transfer fluid is cooler than the incoming gas.

Magnesium-containing product from the gaseous stream is condensed or deposited on the inside walls of the tubes 106 as the gaseous stream cools and the magnesium-containing product condenses, deposits, precipitates or otherwise falls out of the gaseous stream. The magnesium-containing product can be referred to as the condensate, whether liquid (obtained by condensation) or solid (obtained by deposition). In some implementations, such as when the incoming gaseous stream is the product of carbothermal reduction, the condensate contains the desired metal product (in this example, the magnesium) and undesired products of reversion (e.g., C and MgO), and probably other impurities. FIG. 1 shows the impure condensate as 120 collected on the walls of the tubes 106. The remaining gaseous stream exits the condenser 100 at the outlet 104.

The condensate 120 can be periodically removed from the walls of the tube 106 by heating the chamber 103, such as by using electrical heating elements 116 or other heat source, to melt, boil, and/or sublimate the condensate 120 from the walls. Insulation 118 can be present to improve the heating. Any residue of the condensate 120 that remains can be removed by scraping, brushing, blowing, or any other physical or chemical mechanism.

In yet another alternate example, the condenser 100, particularly the chamber 103, can be heated by flowing a heat transfer fluid (the same or different than that used to obtain the condensate 120 on the walls of the tube 106 from the gaseous stream) through the shell side of the condenser at a temperature at or above the melting or vaporization temperature of the Mg metal product thereby separating the desired product from the undesired reversion products or impurities. For example, heating to above 650° C. at a pressure below 0.4 kPa, the triple point of Mg, will sublimate the Mg in the condensate 120, allowing the Mg to flow out of the tubes to where it can be collected, while having the impurities such as MgO and C remain in the solid state, shown as impurities 130 on the walls of the tubes 106. As another example, heating to above 1090° C. at atmospheric pressure, the boiling or vaporization point of Mg, will vaporize the Mg in the condensate 120, allowing the Mg to flow either up or down out of the tubes where it can be collected, while having the impurities 130 such as MgO and C remain in the solid state. Such are examples of in situ separation, particularly distillation, of the Mg metal.

It is noted that FIG. 1 shows both condensate 120 and the impurities 130 in the tubes 106 simultaneously; such will typically not be the case. Rather, typically one of the condensate 120 or the impurities 130 will be present.

Figure 2:
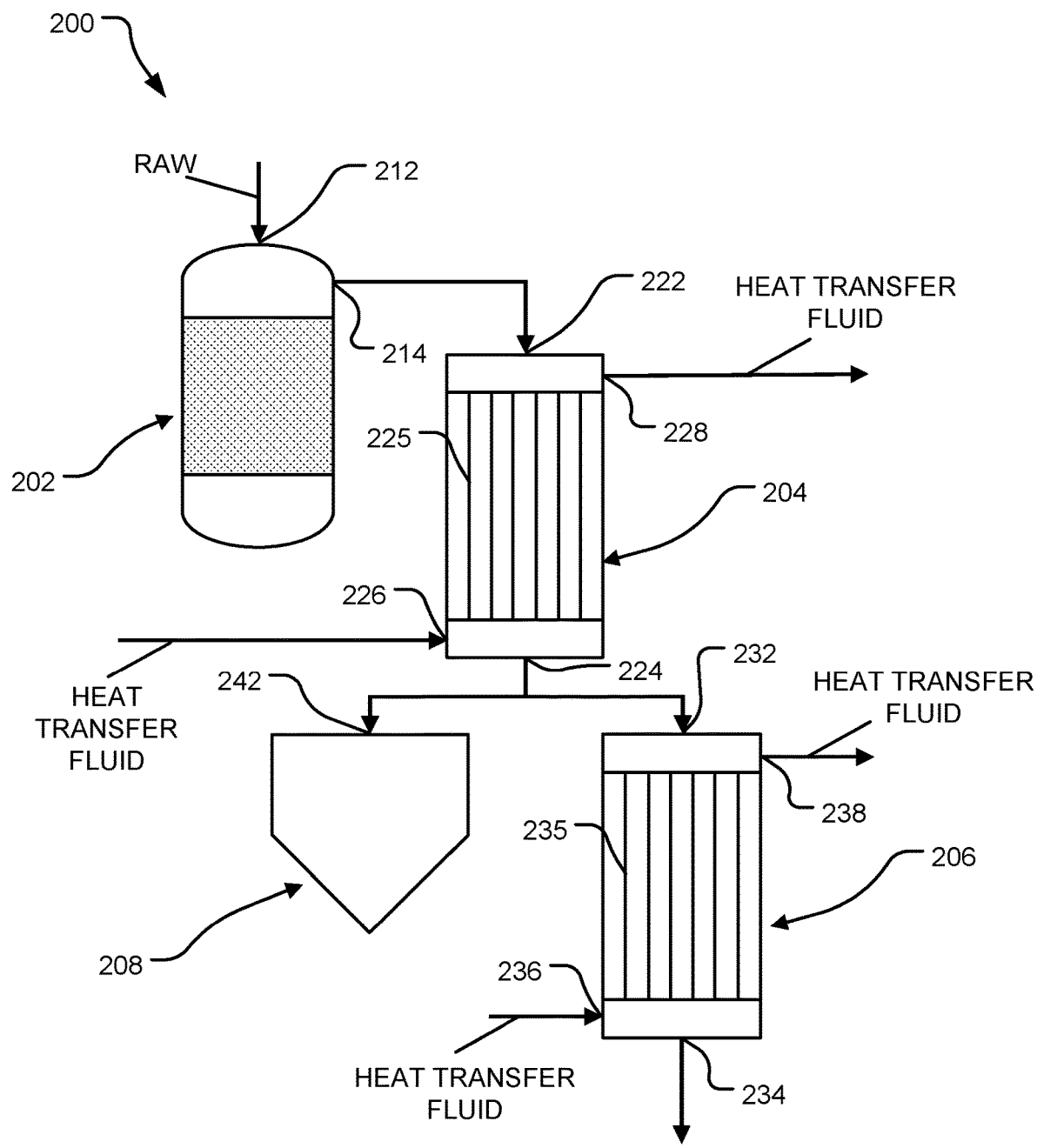
FIG. 2 is a schematic diagram of a batch operation to produce Mg by carbothermal reduction.

FIG. 2 illustrates a system 200 that is particularly suited for a condenser such as the condenser 100 of FIG. 1 and its operation. FIG. 2 illustrates a possible process flow for a batch operation to produce Mg from carbothermal reduction. The initial production of Mg and CO from a reduction furnace flows to a primary condenser where Mg condenses along with the reversion product in an impure crown. Once a crown of suitable size is produced, the flow of CO is terminated, and the Mg is distilled from the impure crown. The Mg vapors can then be collected in a secondary condenser or other suitable collection vessel to form a pure crown. The pure crown can then be removed by physical or chemical means. The reversion product and other minor impurities can be removed from the primary condenser, to provide a clean surface for Mg subsequent condensation, by any physical or chemical means and can be collected in a separate vessel.

The system 200 has a reactor 202, which can be one of a general smelting operation, having an inlet 212 and an outlet 214. The reactor 202 may be a retort furnace, an electric arc furnace, or any other type of reactor that is used to liberate elemental magnesium by carbothermal reduction for the purpose of generating magnesium metal as a product. Raw materials, such as ore, are fed into the reactor 202 via the inlet 212. Gaseous products, primarily Mg and CO, obtained from the raw materials are released from the reactor 202 from the outlet 214 and flow to a condenser 204.

The condenser 204 has a gaseous stream inlet 222 at the top or upper end to receive the output from the reactor 202 and a gaseous stream outlet 224 at the bottom or lower end. The condenser 204 shown in FIG. 2 is of a shell and tube design although in alternate implementations it could be, e.g., plate/plate condenser, or any another design. Within the condenser 204 is a condensing chamber having a plurality of tubes 225 distributed throughout the chamber, in this example, in a generally vertical orientation. From the inlet 222, the gaseous stream flows to and through the tubes 225 to the outlet 224.

The chamber of the condenser 204 is maintained at the desired temperature using a heat transfer fluid or media on the shell-side of the condenser 204, flowing from a second inlet 226 at the bottom or lower end of the condenser 204 through the shell-side of the condenser 204 (i.e., not through the tubes 225) around the tubes 225 to a second outlet 228 at the top or upper end of the condenser 204. Additionally or alternately, a heating unit may be present in or around the condenser 204.

The gaseous product released from the furnace is condensed or deposited on the inside walls of the tubes 225 as the gaseous stream flows through the tubes 225 and cools, so that the magnesium-containing product condenses, deposits, precipitates or otherwise falls out of the gaseous stream. Magnesium can be removed from the condenser 204 by raising the temperature of the apparatus and releasing magnesium as a gas, leaving behind solid by-product residue. This gas can be pulled via gaseous stream outlet 224 into a secondary condenser 206 at an inlet 232 where it enters tubes 235. Mg metal can then be condensed into a solid or liquid in the tubes 235 without fear of reversion.

The secondary condenser 206 is also temperature controlled, such as by a heat transfer fluid or media by indirect contact or by other heating or cooling mechanism. FIG. 2 shows the secondary condenser 206 with a shell and tube configuration with an inlet 236 and an outlet 234 for heat transfer fluid, although in alternate implementations it could be, e.g., plate/plate condenser or heat exchanger, or other design. The secondary condenser 206 may be the same configuration or different than the primary condenser 204.

As in the primary condenser 204, the gaseous stream is cooled so that gaseous Mg condenses or deposits on the walls of the tubes 235 of the secondary condenser 206. As with the primary condenser 204, the condensed or deposited Mg metal can be sent to other unit operations such as melting and casting.

Once the primary condenser 204 has been liberated of magnesium, the by-product residue can be sent to a separate collection vessel 208 via an inlet 242 for a subsequent process step.

The following non-limiting exemplary embodiments provide various alternate details for the condensers, systems, and methods described above.

Working Example 1

In this example, carbothermal reduction chemistry was used to liberate equimolar quantities of magnesium gas and carbon monoxide at approximately 1800° C. and less than 10 kPa in an electric arc furnace. Product gases flowed through the tube-side of the condenser which was also under the same vacuum. The tubes of the condenser were approximately 2" in outer diameter with a length of approximately 30". A hexagonal-packed arrangement of the tubes was configured with seven tubes. Heat transfer fluid flowed into the shell-side of the condenser at temperatures between 450 and 650° C., below the melting point of magnesium. The flow of heat transfer fluid depended on the flow of reaction products, the degree of reversion, and the total pass-through of fines.

The flow and temperature of the heat transfer fluid was controlled such that the change in temperature from the inlet to the outlet was less than 10 K (10° C.). Magnesium metal and reversion products were deposited on the tube walls at metal yields above 50%, even above 75%. The total mass loading in the tubes was approximately 1.5 kg. After this loading was achieved, the flow of reaction products through the condenser was terminated by turning off the reduction reactor. The condenser was then heated by external electrical heating elements to reach temperatures above 650° C., including above 700° C. The vacuum conditions of the condenser were then reduced to distill the metal in situ. Metal distillate flowed into a secondary condenser to form a high purity metal crown. In a second step, the solid residue remaining in the primary condenser was cleaned via brushes, facilitating the flow into a separate collection vessel.

Embodiment 1

Using carbothermal reduction chemistry to liberate equimolar quantities of magnesium gas and carbon monoxide at approximately 1600° C. and less than 100 mbar in an electric arc furnace. A hexagonal-packed arrangement of the tubes is configured with 1 to 500 tubes or more. A lead-bismuth heat transfer alloy flows through the shell-side of the condenser at temperatures between 200-650° C. The flow of alloy depends on the flow of reaction products, the degree of reversion, and the total pass-through of fines. The flow of the heat transfer alloy is controlled so that the change in temperature from inlet to the outlet is less than 50 K (50° C.). The magnesium metal and reversion products are deposited on the tube walls at metal yields above 50%, and even above 75%. Once an adequate loading is achieved on the tube walls, flow of reaction products through the condenser is turned off, either by diverting flow into another condenser or by turning off the reduction reactor. The condenser is then heated by external electrical heating elements to reach temperatures above 650° C., and preferably above 700° C. Metal distillate flows into a secondary condenser to form a high purity metal crown. In a second step, the solid residue remaining in the primary condenser is cleaned via brushes, facilitating flow into a separate collection vessel.

Embodiment 2

In this embodiment, metallothermic reduction chemistry is used to liberate magnesium gas with little by-product oxide gases such as CO, with the gas flowing through the tube-side of the condenser. The same dimensions and configuration for the condenser as Embodiment 1 are used. A similar procedure is used to distill metal product into a secondary condenser to form high purity metal product. Optionally, the metal condensate may be melted to facilitate molten flow out of the primary condenser and into subsequent foundry steps for refining and casting. Essentially no residue remains in the condenser and no cleaning is required.

Embodiment 3

Similar to Embodiment 2, added on is another condenser unit connected in parallel to a single furnace. A cyclic process is used to achieve continuous production.

Embodiment 4

In this embodiment, the tubes of a shell and tube condenser are fitted with internal fins to increase heat transfer.

Embodiment 5

In this embodiment, the mode of heating the condenser to initiate in situ distillation is modified to use a higher temperature heat transfer fluid, operating at temperatures near 750° C. Any necessarily valving and plumbing is included to swap the heat transfer fluids.

Embodiment 6

In this embodiment, magnesium metal is vacuum distilled from crude metal. The crude metal may be scrap, initial condensate from carbothermic reduction, or any other feed. The magnesium gas and any carrier gas (e.g., Ar, $H_2$) are cooled to between 200-650° C., preferably to 500-600° C., to promote deposition as a solid, such that zinc and other volatile impurities by-pass the condenser. A single tube is used, and the magnesium deposits are melted from the condenser.

The above specification and examples provide a complete description of the structure and use of exemplary implementations of the invention. The above description provides specific implementations. It is to be understood that other implementations are contemplated and may be made without departing from the scope or spirit of the present disclosure. The above detailed description, therefore, is not to be taken in a limiting sense. For example, elements or features of one example, embodiment or implementation may be applied to any other example, embodiment or implementation described herein to the extent such contents do not conflict. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass implementations having plural referents, unless the content clearly dictates otherwise. As used in this specification and the appended claims, the term "or" is generally employed in its sense including "and/or" unless the content clearly dictates otherwise.

The invention claimed is:

1. A method for condensing magnesium (Mg) metal from a gaseous stream, the method comprising:
feeding a magnesium-containing gaseous stream at a temperature of at least 650° C. into a heat exchanger;
cooling the magnesium-containing gaseous stream with a cooling heat transfer fluid not in direct communication with the magnesium-containing gaseous stream at a temperature of 200-650° C. to deposit magnesium metal on walls of the heat exchanger of at least 35 wt-% Mg; and
inducing a phase change in the deposited magnesium metal by raising the temperature of the heat exchanger using a heating heat transfer fluid of the same composition as the cooling heat transfer fluid, thus heating the magnesium metal to at least the boiling point of magnesium, to allow the magnesium metal to flow into another area for further processing.

2. The method of claim 1, wherein cooling the magnesium-containing gaseous stream in the heat exchanger deposits solid magnesium metal.

3. The method of claim 1, wherein the heat exchanger has a tube/shell configuration.

4. The method of claim 1, wherein the heat exchanger has a plate/plate configuration.

5. The method of claim 1, further comprising operably connecting the heat exchanger to a vacuum source.

6. The method of claim 1, wherein the heat exchanger is equipped with appropriate valves, pumps and tanks to replace the cooling heat transfer fluid with the heating heat transfer fluid.

7. The method of claim 1, wherein the magnesium-containing gaseous stream further comprises a non-condensable and non-oxidizing inert gas.

8. The method of claim 1, wherein the magnesium-containing gaseous stream further comprises carbon monoxide.

9. The method of claim 1, wherein the heat transfer fluid comprises at least one of molten metal, molten salt, high temperature oil, high pressure water, steam, and air.

10. The method of claim 9, wherein the molten metal is lead, tin, bismuth or mixture thereof.

11. The method of claim 9, wherein the molten salt is nitrate, chloride, fluoride, or mixture thereof.

12. The method of claim 1, further comprising obtaining the magnesium-containing gaseous stream via one or more of:
- metallothermic reduction of magnesium oxide rich ores;
- an electrolytic cell;
- a distillation apparatus producing magnesium gas by distillation of crude magnesium metal; and
- carbothermal reduction of magnesium oxide rich ore.

13. The method of claim 1, wherein the magnesium metal deposited on the walls of the heat exchanger comprises at least 99 wt-% Mg.

14. The method of claim 1, wherein a set of scrapers, brushes, and/or nozzles are positioned to remove deposits from the walls of the heat exchanger after the magnesium metal has been allowed to flow into the another area for further processing.

15. The method of claim 1, further comprising extracting heat from the cooling heat transfer fluid using a heat transfer medium.

* * * * *